United States Patent
Yamaguchi et al.

(10) Patent No.: US 9,356,480 B2
(45) Date of Patent: May 31, 2016

(54) ELECTRIC MOTOR HAVING ROTOR STRUCTURE FOR AVOIDING DEFECT DUE TO STRAIN GENERATED BY TEMPERATURE CHANGE, AND PRODUCTION METHOD THEREOF

(71) Applicant: Fanuc Corporation, Yamanshi (JP)

(72) Inventors: Akira Yamaguchi, Yamanashi (JP); Tsuyoshi Furuya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 166 days.

(21) Appl. No.: 13/780,581

(22) Filed: Feb. 28, 2013

(65) Prior Publication Data

US 2013/0270956 A1    Oct. 17, 2013

(30) Foreign Application Priority Data

Apr. 11, 2012    (JP) .................................. 2012-090041

(51) Int. Cl.
*H02K 1/28* (2006.01)
*H02K 1/27* (2006.01)
(Continued)

(52) U.S. Cl.
CPC .. *H02K 1/28* (2013.01); *H02K 1/27* (2013.01); *H02K 1/276* (2013.01); *H02K 15/03* (2013.01); *H02K 15/12* (2013.01)
USPC ............ 310/156.27; 310/156.56; 310/156.53; 310/216.015; 29/598

(58) Field of Classification Search
CPC   H02K 1/27–1/28; H02K 1/276; H02K 15/12; H02K 15/03
USPC ............ 310/156.25, 156.27, 156.53, 156.56, 310/216.015–216.017, 156.21; 29/598
See application file for complete search history.

(56) References Cited

U.S. PATENT DOCUMENTS 4,127,786 A  *  11/1978  Volkrodt .................. 310/156.84
4,559,463 A  *  12/1985  Kobayashi ............... 310/156.53
5,091,668 A  *   2/1992  Cuenot et al. ............ 310/156.61
(Continued)

FOREIGN PATENT DOCUMENTS

DE    10 2009 027 916 A1    1/2011
DE    10 2009 054 584 A1    6/2011
(Continued)

OTHER PUBLICATIONS

English Machine Translation, Nakano et al., JP 2000-324736, Nov. 2000.*

(Continued)

*Primary Examiner* — Burton Mullins
(74) *Attorney, Agent, or Firm* — Hauptman Ham, LLP

(57) ABSTRACT

An electric motor having a rotor structure and a production method thereof, wherein a strain due to temperature change does not occur and a manufacturing problem does not occur. Each permanent magnet does not contact each other, and a deformable intervening member is positioned between the end surfaces of the magnets. Intervening member is an elastically or plastically deformable member, and the thickness of the intervening member in the direction of the rotation axis of the rotor is determined so that the neighboring permanent magnets, which are bonded to a rotor core within a manufacturing temperature range of the rotor, do not contact each other at a lower limit of an operating temperature of the electric motor.

3 Claims, 8 Drawing Sheets

(51) Int. Cl.
*H02K 15/03* (2006.01)
*H02K 15/12* (2006.01)

(56) References Cited

U.S. PATENT DOCUMENTS

| | | | |
|---|---|---|---|
| 5,771,566 A * | 6/1998 | Pop, Sr. | 29/598 |
| 5,936,323 A * | 8/1999 | Shibukawa et al. | 310/156.53 |
| 6,359,359 B1 | 3/2002 | Miura et al. | |
| 6,359,369 B1 | 3/2002 | Iino et al. | |
| 7,854,056 B2 * | 12/2010 | Watanabe et al. | 29/598 |
| 8,020,280 B2 * | 9/2011 | Fukumaru et al. | 29/598 |
| 8,362,668 B2 * | 1/2013 | Takahashi et al. | 310/156.47 |
| 8,723,383 B2 * | 5/2014 | Blanc et al. | 310/156.22 |
| 2003/0104246 A1 * | 6/2003 | Watanabe et al. | 428/692 |
| 2006/0022541 A1 * | 2/2006 | Ong et al. | 310/156.53 |
| 2009/0174273 A1 | 7/2009 | Watanabe et al. | |

FOREIGN PATENT DOCUMENTS

| JP | H05-135976 A | 6/1993 |
|---|---|---|
| JP | 07-079537 A | 3/1995 |
| JP | 2000-324736 A | 11/2000 |
| JP | 2002-78257 A | 3/2002 |
| JP | 2002-272033 A | 9/2002 |
| JP | 2003-164085 A | 6/2003 |
| JP | 2009-296696 A | 12/2009 |
| JP | 2010-141989 A | 6/2010 |
| JP | 2010-259231 A | 11/2010 |
| JP | 2011-205781 A | 10/2011 |
| JP | 2012-029343 A | 2/2012 |

OTHER PUBLICATIONS

English Machine Translation, Furukawa et al., JP 2009-296696, Dec. 2009.*
English Machine Translation, Ikemi et al. JP 2010-141989, Jun. 2010.*
Nylon, Wikipedia, https://en.wikipedia.org/wiki/Nylon, Jul. 2015.*
Epoxy, Wikipedia, https://en.wikipedia.org/wiki/Epoxy, Jul. 2015.*
Dynalab Corp., "Plastic Properties of Nylon (Polyimide)", www.dynalabcorp.com/technical_info_nylon_asp, Jul. 2015.*
Corresponding JP 2012-090041 Office Action dated May 7, 2013.
Office Action dated Dec. 17, 2014 in corresponding German Patent Application No. 10 2013 006 459.7, 18 pages.
"Lost-wax Casting", Wikipedia, Feb. 16, 2015, 20 pages, URL: http://en.wikipedia.org/wiki/Lost-wax_casting.

* cited by examiner the present invention relates to an electric motor and a
ELECTRIC MOTOR HAVING ROTOR STRUCTURE FOR AVOIDING DEFECT DUE TO STRAIN GENERATED BY TEMPERATURE CHANGE, AND PRODUCTION METHOD THEREOF

RELATED APPLICATIONS

The present application is based on, and claims priority from, Japan Application Number 2012-090041, filed Apr. 11, 2012, the disclosure of which is hereby incorporated by reference herein in its entirety.

BACKGROUND OF THE INVENTION

1. Field of the Invention

The present invention relates to an electric motor and a production method thereof, the electric motor having a rotor structure for avoiding a defect, such as bending of the rotor and breakage of a magnet, due to thermal strains of a magnetic steel plate, a shaft and the magnet, etc., which constitute the rotor.

2. Description of the Related Art

Generally, major components for constituting a rotor of a synchronous electric motor are a magnetic steel plate, a carbon steel shaft and a permanent magnet. The structure of the rotor may include: an SPM (Surface Permanent Magnet) structure wherein a permanent magnet is attached to a rotor surface; and an IPM (Interior Permanent Magnet) structure wherein a permanent magnet is embedded into a magnet electric plate.

In the prior art, an electric motor is required to have a large maximum output or maximum torque, while having a small inertia moment. Therefore, when designing or manufacturing an electric motor, a rotor structure thereof is usually configured to extend in the axial direction. In such an electric motor, a neodymium magnet (NdFeB) having high magnetic force is used in many cases. As a means for fixing the neodymium magnet to a core structure wherein magnetic steel plates are stacked, adhesive agent is usually used. As an adhesive agent, a one-component thermoset adhesive agent is widely used.

In order to avoid strain on a rotor having a plurality of magnets, some techniques have been proposed. For example, in Japanese Unexamined Patent Publication (Kokai) No. 2002-78257 discloses a rotor having a permanent magnet, and describes that "a motor of the invention has a plurality of poles and a rotor, wherein a gap is formed between neighboring permanent magnets of the poles. Even when the temperature is varied, thermal strain between the permanent magnet and the rotor is reduced, whereby detachment of the component may be limited." Further, it is described that "in the motor of the invention, the gap between neighboring permanent magnets is filled with an adhesive agent and beads. By filling the gap between permanent magnets with the adhesive agent and beads having predetermined dimensions, the thickness between the neighboring permanent magnets may be constant, whereby the dimension of the motor may be easily controlled."

On the other hand, Japanese Unexamined Patent Publication (Kokai) No. 2011-205781 discloses an electric motor having a permanent magnet, and describes that "when a permanent magnet is inserted into a magnet insert space formed in a rotor core, thin rubbers are temporarily attached to upper and lower ends in relation to the inserting direction of the magnet, and then the permanent magnets are sequentially inserted. After one or more magnet is inserted so as to stack the magnets in the rotational direction, the rotor core is tightened from both ends thereof so that pressure is applied to the thin rubber on the end of the magnet, whereby a rotor structure is constituted."

In the rotor of the prior art wherein a neodymium magnet is bonded and fixed to a rotor core having stacked magnet steel plate, strain is generated due to the difference in linear expansion coefficients of the neodymium magnet and iron which constitutes the rotor. After the two components having different linear expansion coefficients are bonded by an impregnating agent (or adhesive agent), as the temperature is varied from when the adhesive agent is cured, a difference occurs between the axial lengths of the iron and the magnet, whereby strain is generated. Due to strain, following defects may be generated.

The adhesive agent for adhering the magnet is cracked, and the magnet may detach.

The rotor may bend due to unevenness of the adhesive.

The magnet may cracked.

A gap may form between the stacked magnetic steel plate.

In particular, in a rotor which is relatively long in the axial direction, a plurality of magnets are stacked in the axial direction, the above defects may seriously occur corresponding to the axial length thereof.

FIG. 11 concretely explains the above problems in a rotor of the prior art. A rotor 50 as shown in FIG. 11 is an IPM rotor, and has a rotor core 54 constituted by stacking annular magnetic steel plate 52, a plurality of permanent magnets 56 embedded into rotor core 54, and two end plates 58 which clamps magnetic steel plate 52 from both sides in the axial direction. Each permanent magnet 56 is a neodymium magnet which has a generally plate shape, and the shapes of the permanent magnets are identical to each other. The permanent magnets are constituted as a plate extending in the axial direction of the rotor, and the plate is inserted into a slot 60, extending in the axial direction, formed in rotor core 54. A major surface of each permanent magnet 56 is bonded to an inner surface of slot 60 by means of thermoset adhesive agent (or impregnating agent) 62.

From the state of section (a) of FIG. 11, when the temperature of rotor core 54 (at least a portion of rotor 54 near adhesive agent 62) reaches a curing temperature of adhesive agent 62, magnetic steel plate 52 having a relatively high linear expansion coefficient (for example, $12 \times 10^{-6}$/K) expands in the generally axial direction of rotor 54 (in the horizontal direction), as shown in section (b) of FIG. 11. On the other hand, the axial size of permanent magnet 56 is not substantially changed, since a linear expansion coefficient of permanent magnet 56 in the axial direction is considerably small (in the case of the neodymium magnet, $-0.5 \times 10^{-6}$/K). In such a state, adhesive agent 62 is cured so that permanent magnet 56 and magnetic steel plate 52 are bonded.

Next, when the temperature of rotor core 54 is lowered to a lower limit of the operating temperature of the electric motor, magnetic steel plate 52 is contracts in the generally axial direction. In this regard, since magnet steel plate 52 is bonded and fixed to permanent magnet 56, a portion of magnetic steel plate 52 near permanent magnet 56 does not contract and a portion of magnetic steel plate 52 near the outer surface or the center of rotor core 54 contracts as the temperature decreases. As a result, a strain is generated and a stress resides in rotor core 54, as shown in section (c) of FIG. 11. Further, as shown in section (d) of FIG. 11, due to the stress by the strain, a crack 64 may occur in magnetic steel plate 52, the rotor shaft may bend (not shown), and/or a crack or damage may occur in permanent magnet 56.

In the technique of Japanese Unexamined Patent Publication (Kokai) No. 2002-78257, a gap is formed between the permanent magnets so that the stress by the strain due to the row of the magnets is not generated. However, when such technique is applied to the IPM structure, it is difficult to form a constant gap between the magnets, in terms of the structure or manufacturing thereof. On the other hand, the technique is applied to the SPM structure, it is necessary to position the permanent magnets while arranging a jig, etc., for forming a constant gap between the magnets, and thus there is a difficulty in manufacturing the structure.

Further, Japanese Unexamined Patent Publication (Kokai) No. 2002-78257 describes that adhesive agent is filled in the gap between the magnets and polyethylene beads or silicone rubber beads are added to the adhesive agent. However, it is difficult to assuredly fill the adhesive agent in the gap between the magnets since such an operation depends on the characteristic of the adhesive agent and the skill of an operator. Further, in the operation, it is necessary to remove the adhesive agent which protrudes from the gap to the surface of the magnet. Moreover, when the beads are added to the adhesive agent, the characteristic of the adhesive agent may be affected. Since the distribution density of the beads may be uneven in the adhesive agent, adhesive effect of the adhesive agent may be unstable.

On the other hand, in the structure of Japanese Unexamined Patent Publication (Kokai) No. 2011-205781, an elastic thin plate is attached to a surface of the magnet facing in the axial direction, and fastening force is applied to the structure from both axial ends thereof, by means of fastening plates, so that pressing force is applied to the elastic thin plate. However, in the structure of Japanese Unexamined Patent Publication (Kokai) No. 2011-205781, adhesives are not used to fix the permanent magnets, and thus the structure is not intended to accommodate the strain due to the difference in the linear expansion coefficients. Further, the object of the invention of Japanese Unexamined Patent Publication (Kokai) No. 2011-205781 is to prevent the magnet from being damaged when the magnet is inserted and fixed in the manufacturing process of the rotor, and thus does not solve the defect due to the thermal strain.

SUMMARY OF THE INVENTION

Thus, the object of the present invention is to provide an electric motor having a rotor structure and a production method thereof, wherein strain due to a temperature change does not occur and a manufacturing problem does not occur.

One aspect of the present invention provides an electric motor comprising a stator and a rotor configured to be rotated relative to the stator, wherein the rotor comprises: a rotor core constituted by stacking magnetic steel plates; a plurality of permanent magnets aligned in a direction of a rotation axis of the rotor, the permanent magnets being bonded and fixed to the magnetic steel plate by means of adhesives; and an intervening member positioned between the permanent magnets which are adjacent to each other in the direction of the rotation axis, wherein a thickness of the intervening member in the direction of the rotation axis is determined so that neighboring permanent magnets, which are bonded to the rotor core within a manufacturing temperature range of the rotor, do not contact each other at a lower limit of an operating temperature of the electric motor.

In a preferred embodiment, the intervening member is elastically or plastically deformable.

In a preferred embodiment, the permanent magnets are bonded and fixed in a magnet insert hole which is formed in the rotor core extends in the direction of the rotation axis.

In a preferred embodiment, the permanent magnets are bonded and fixed to a surface of the rotor core.

Another aspect of the present invention provides a production method of an electric motor comprising a stator and a rotor configured to be rotated relative to the stator, wherein the method comprises the steps of: constituting a rotor core by stacking magnetic steel plates; aligning a plurality of permanent magnets in a direction of a rotation axis of the rotor and fixing the permanent magnets to the magnetic steel plate by means of adhesives; and positioning an intervening member between the permanent magnets which are adjacent to each other in the direction of the rotation axis, wherein a thickness of the intervening member in the direction of the rotation axis is determined so that neighboring permanent magnets, which are bonded to the rotor core within a manufacturing temperature range of the rotor, do not contact each other at a lower limit of an operating temperature of the electric motor.

In a preferred embodiment, the method further comprises the step of further heating the rotor after the adhesives are cured so that the intervening member melts and flows from between neighboring permanent magnets.

In a preferred embodiment, the method comprises the step of alternately inserting the permanent magnet and the intervening member into a magnet insert hole which is formed in the rotor core.

In a preferred embodiment the method comprises the step of previously adhering the intervening member to an end surface of the permanent magnet which faces in the direction of the rotation axis.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
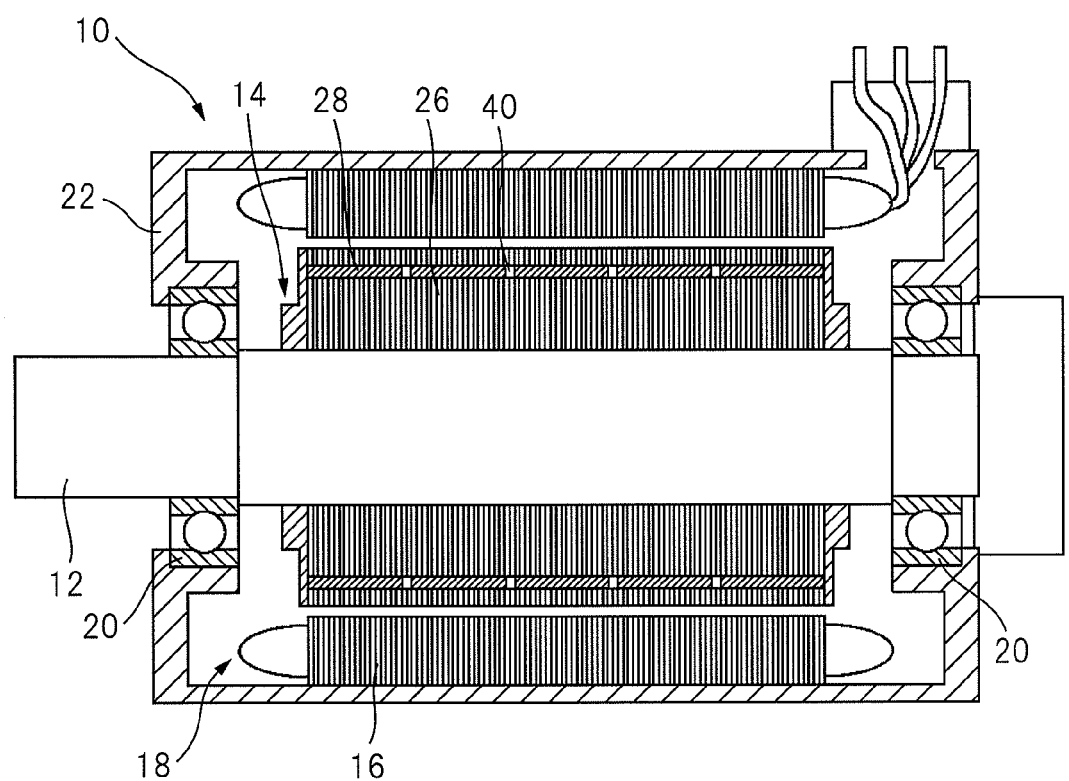
FIG. 1 is a view of a schematic configuration of an electric motor according to one embodiment of the present invention.

FIG. 1 is a view of a schematic configuration of an electric motor 10 according to one embodiment of the present invention. Rotor 10 has a rotor 14 into which a shaft 12 (i.e., a rotation axis) is inserted, a stator 18 constituted by stacking annular magnetic steel plates 16, and a casing 22 which contains rotor 14 and stator 18 and rotatably supports shaft 12 by means of a bearing 20. Since the components other than rotor 14 may be conventional, a detailed explanation thereof is omitted.

Figure 2:
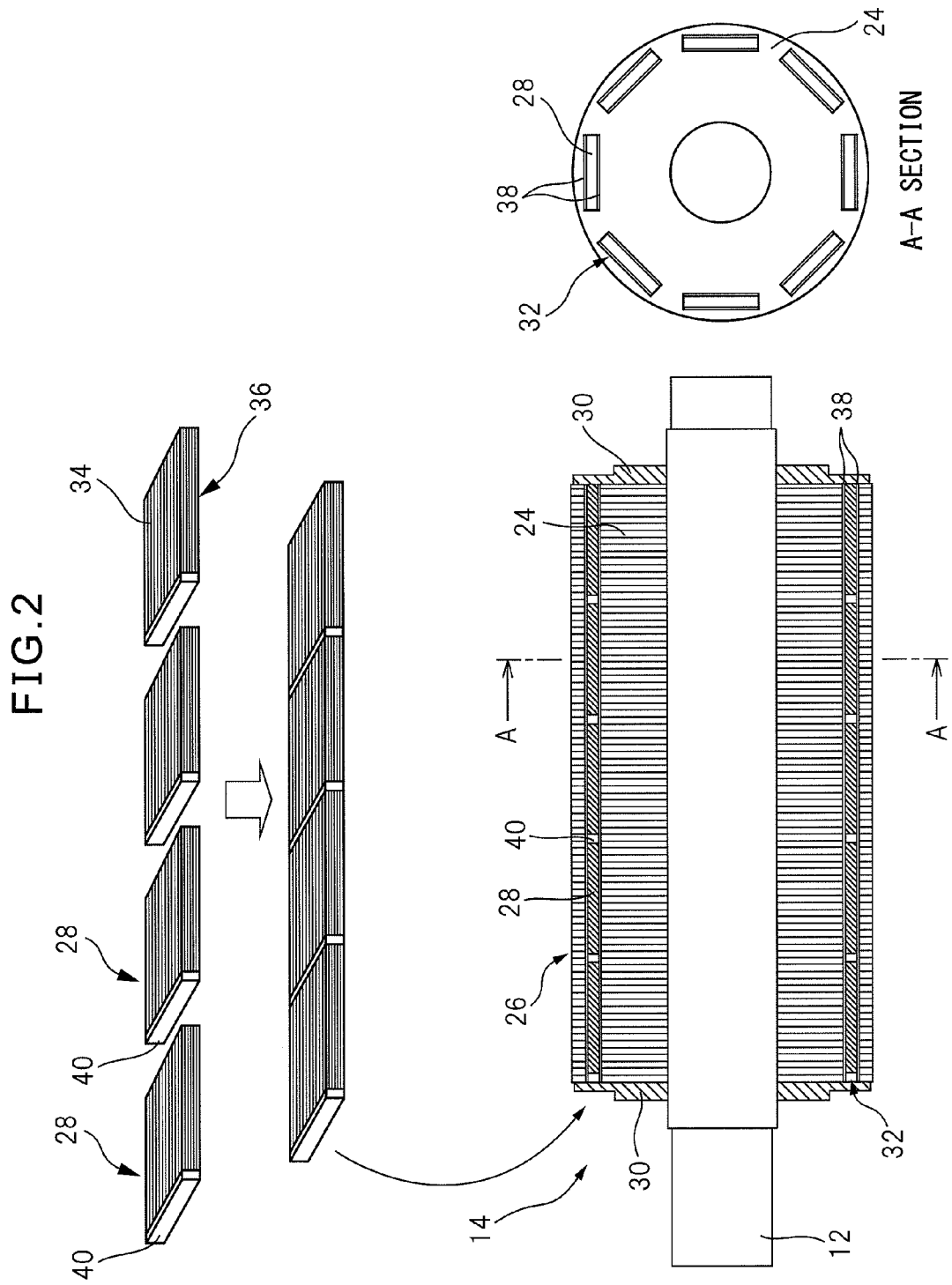
FIG. 2 is an axial cross-sectional view of a rotor of the electric motor of FIG. 1.

FIG. 2 shows rotor 14 of electric motor 10 of FIG. 1. Rotor 14 of FIG. 2 is an IPM structure rotor in which permanent magnets are embedded. Rotor 14 has a rotor core 26 constituted by stacking annular magnetic steel plates 24, a plurality of permanent magnets 28 embedded in rotor core 26, and two end plates 30 which sandwiches or clamps magnetic steel plates 24 from both axial sides. For example, each permanent magnet 28 is a neodymium magnet having a generally plate shape, and preferably, each magnet has the same shape. As shown in FIG. 2, permanent magnets 28 are aligned in the direction of the rotation axis (in detail, an end surface of each magnet faces each other so as to constitute a magnet plate extending in the direction of the rotation axis of the rotor), and are inserted into a magnet insert hole or slot 32 which is formed in rotor core 26 and extends in the direction of the rotation axis. Major surfaces 34 and 36 of each permanent magnet 28 are bonded to an inner surface of slot 32 by means of thermoset adhesive agent (or impregnating agent) 38. Each permanent magnet 28 does not contact each other, and a deformable intervening member 40 is positioned between the end surfaces of the magnets.

Intervening member 40 is an elastically or plastically deformable member, and the thickness of intervening member 40 in the direction of the rotation axis of the rotor is determined so that neighboring permanent magnets 28, which are bonded to rotor core 26 within a manufacturing temperature range of the rotor, do not contact each other at a lower limit of an operating temperature of the electric motor, as explained below.

Figure 3:
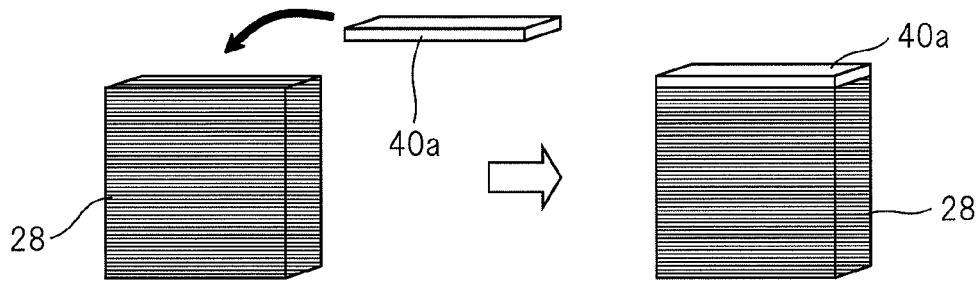
FIG. 3 is a view showing an example wherein an intervening member positioned between permanent magnets is a sheet member.

FIGS. 3 to 6 show various examples of intervening member 40. First, FIG. 3 shows an example wherein the intervening member is an elastically or plastically deformable sheet-like member 40a, such as rubber or resin. Sheet-like member 40a is bonded to the axial end surface of permanent magnet 28 by means of adhesive agent, etc., and functions as the intervening member.

Figure 4:
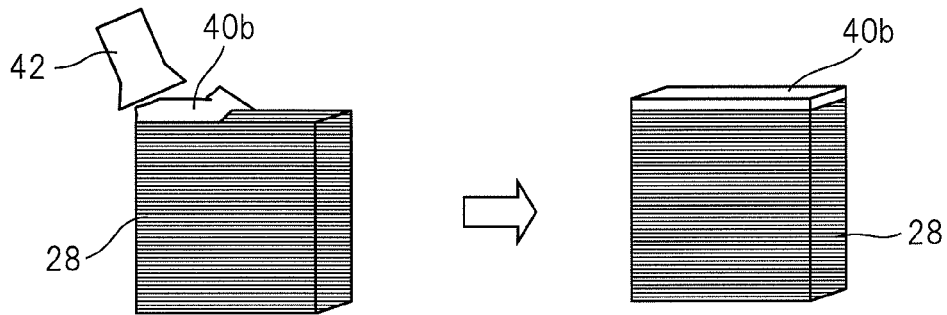
FIG. 4 is a view showing an example wherein the intervening member is silicon resin or urethane foam applied to the permanent magnet.

FIG. 4 shows an example wherein the intervening member is a liquid resin 40b which has elasticity like rubber, after being cured. Liquid resin 40b is applied to the axial end surface of permanent magnet 28 by means of a paddle 42, etc., and functions as the intervening member after being cured.

Figure 5:
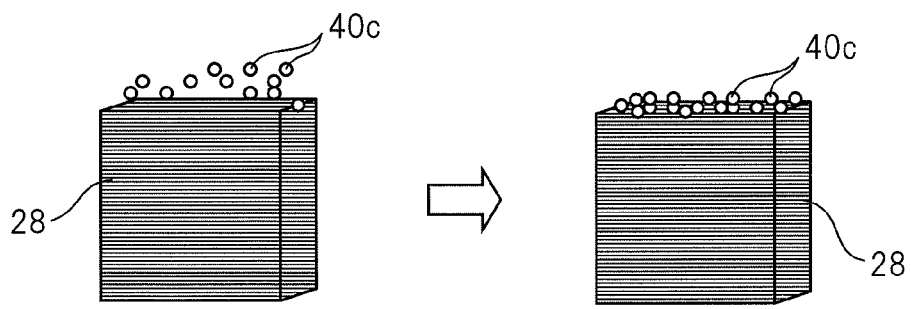
FIG. 5 is a view showing an example wherein the intervening member is foamed polystyrene beads.

FIG. 5 shows an example wherein the intervening member is an elastically or plastically deformable beads 40c, such as foamed polystyrene. Beads 40c are bonded to the axial end surface of permanent magnet 28 by means of adhesive agent, etc., and functions as the intervening member.

Figure 6:
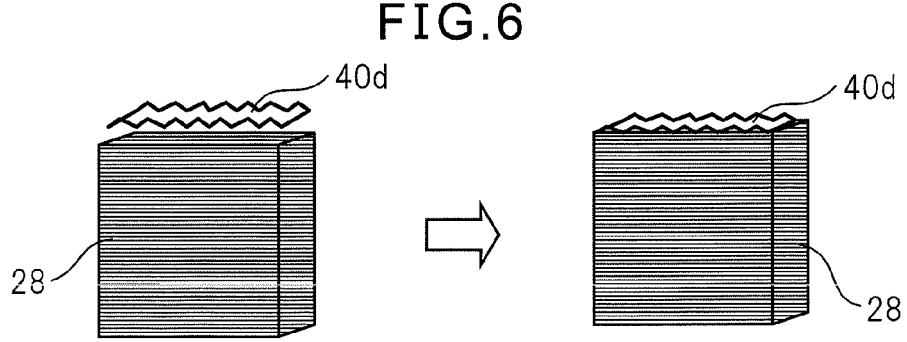
FIG. 6 is a view showing an example wherein the intervening member is a corrugated metal or resin.

FIG. 6 shows an example wherein the intervening member is a corrugated plate member 40d, which is formed by corrugating a resin plate or a metal plate so that the plate has certain elasticity. Corrugated plate member 40d is bonded to the axial end surface of permanent magnet 28 by means of adhesive agent, etc., and functions as the intervening member.

Other than the examples of FIGS. 3 to 6, a resin having a relatively low melting point, which is higher than a curing temperature of the adhesive agent (i.e., the electric motor is not affected at the melting point), a metal, such as tin (having a melting point of 232 degrees C.) or a low-melting-point metal (for example, an alloy having melting point of 138 degrees C. containing bismuth, tin, lead and cadmium), may be used as the intervening member. In other words, when using a member which melts at a temperature higher than the curing temperature of the adhesive agent (or impregnating agent), in a process of heating and curing the adhesive agent, the intervening member may be melted by further raising the temperature after curing the adhesive agent so that the intervening member flows between the permanent magnets, whereby an appropriate gap or space may be formed between the permanent magnets.

Next, a production method of the IPM structure motor as shown in FIG. 2 is explained with reference to FIGS. 7 and 8. First, in the embodiment of FIG. 7, intervening member 40 is previously attached or applied to an axial end of permanent magnet 28, and permanent magnet 28 is sequentially inserted into slot 32 formed in the stack of magnetic steel plates 24 (in the illustrated embodiment, five permanent magnets are inserted into one slot 32). Then, thermoset adhesive agent is impregnated between the inner surface of slot 32 and the major surface of permanent magnet 28, and rotor core 26 is heated to the curing temperature of the adhesive agent or more so as to bond and fix permanent magnet 28 to rotor core 26.

Figure 7:
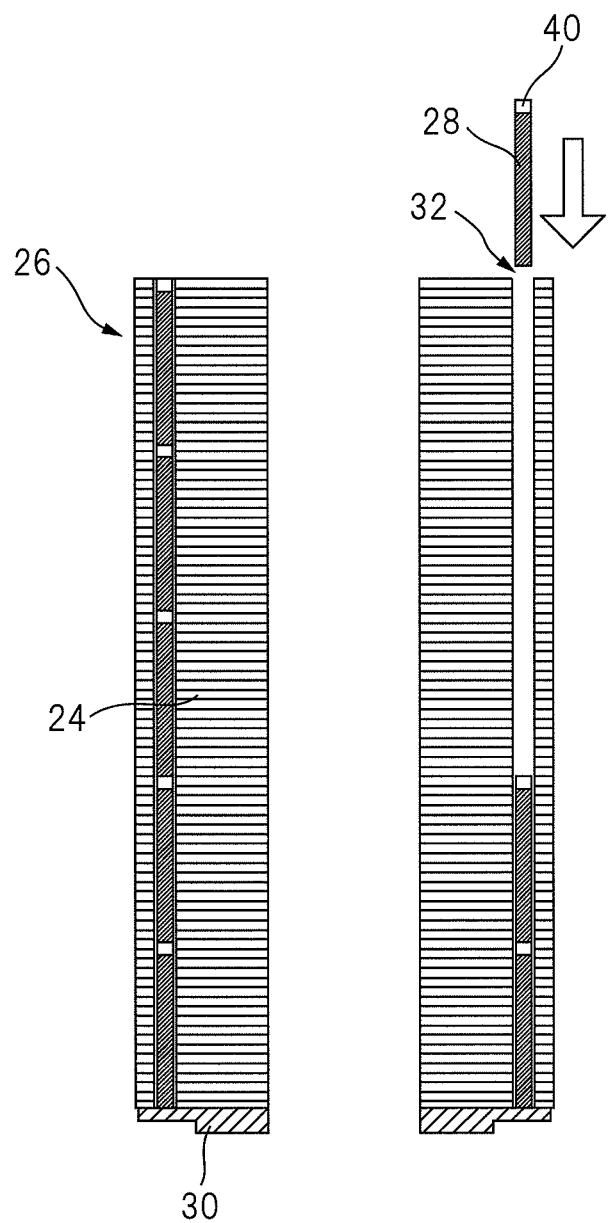
FIG. 7 is a view explaining a production method of the rotor of FIG. 2.
Figure 8:
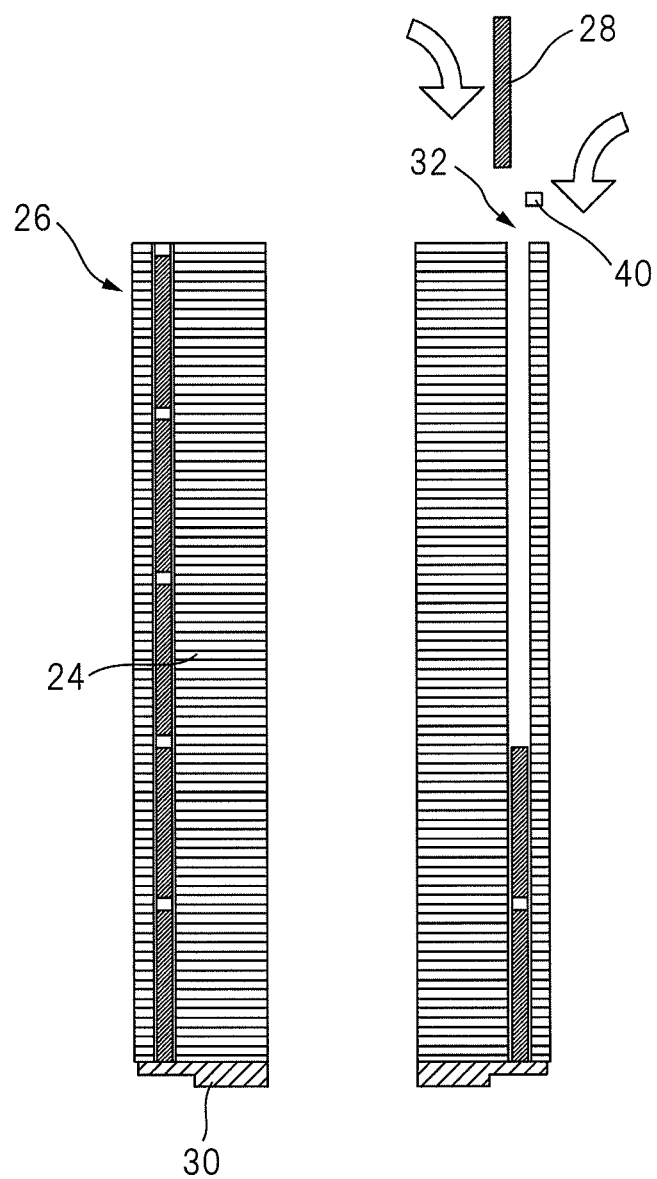
FIG. 8 is a view explaining another production method of the rotor of FIG. 2.

In the embodiment of FIG. 8, intervening member 40 is not previously attached or applied to the axial end of permanent magnet 28 as shown in FIG. 7, instead, permanent magnet 28 and intervening member 40 are alternately inserted into slot 32. In this regard, it is not necessary to attach intervening member 40 to permanent magnet 28. Then, similarly to the embodiment of FIG. 7, thermoset adhesive agent is impregnated between the inner surface of slot 32 and the major surface of permanent magnet 28, and rotor core 26 is heated to the curing temperature of the adhesive agent or more so as to bond and fix permanent magnet 28 to rotor core 26.

Figure 9:
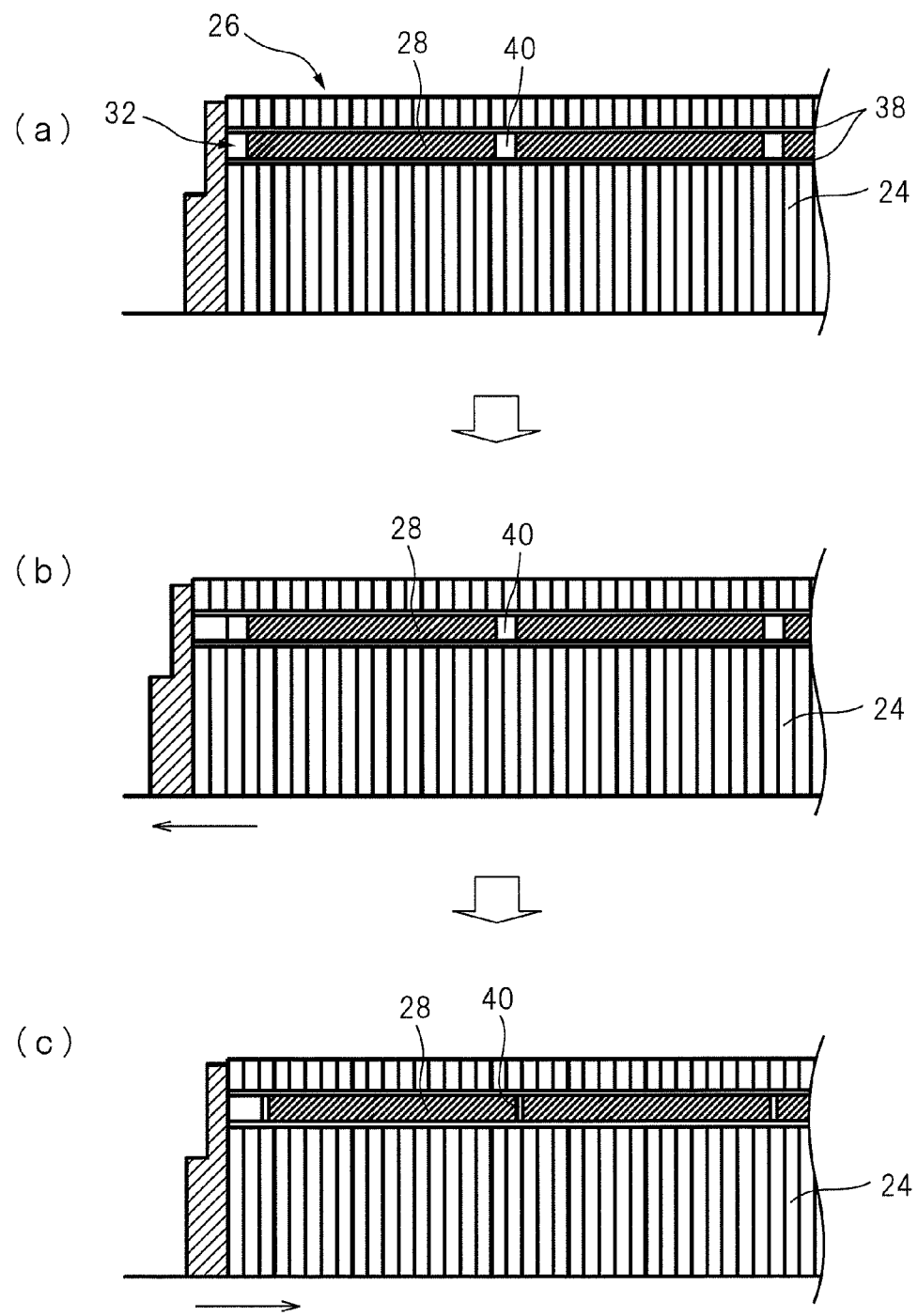
FIG. 9 is a view explaining a function and effect of the intervening member of the rotor of FIG. 2.

Next, the function of intervening member 40 positioned between permanent magnets 28 is explained, with reference to FIG. 9. A section (a) of FIG. 9 shows a part of rotor core 26 before adhesive agent 38 impregnated between the inner surface of slot 32 and the major surface of permanent magnet 28 is cured (generally, at normal temperature). From the state of section (a) of FIG. 9, when the temperature of rotor core 26 (at least a periphery of adhesive 38) is increased to the curing temperature of adhesive agent 38, magnetic steel plate 24 having a relatively high linear expansion coefficient (for example, $12 \times 10^{-6}$/K) expands mainly in the direction of the rotation axis (or the left-right direction), while permanent magnet 28 having a significantly low linear expansion coefficient relative to magnetic steel plate 24 (for example, $-0.5 \times 10^{-6}$/K in the case of a neodymium magnet) changes little in the dimension thereof in the axial direction, as shown in a section (b) of FIG. 9. In the state of the section (b) of FIG. 9, adhesive agent 38 is cured, and then permanent magnet 28 and magnetic steel plate 24 are bonded to each other.

Figure 11:
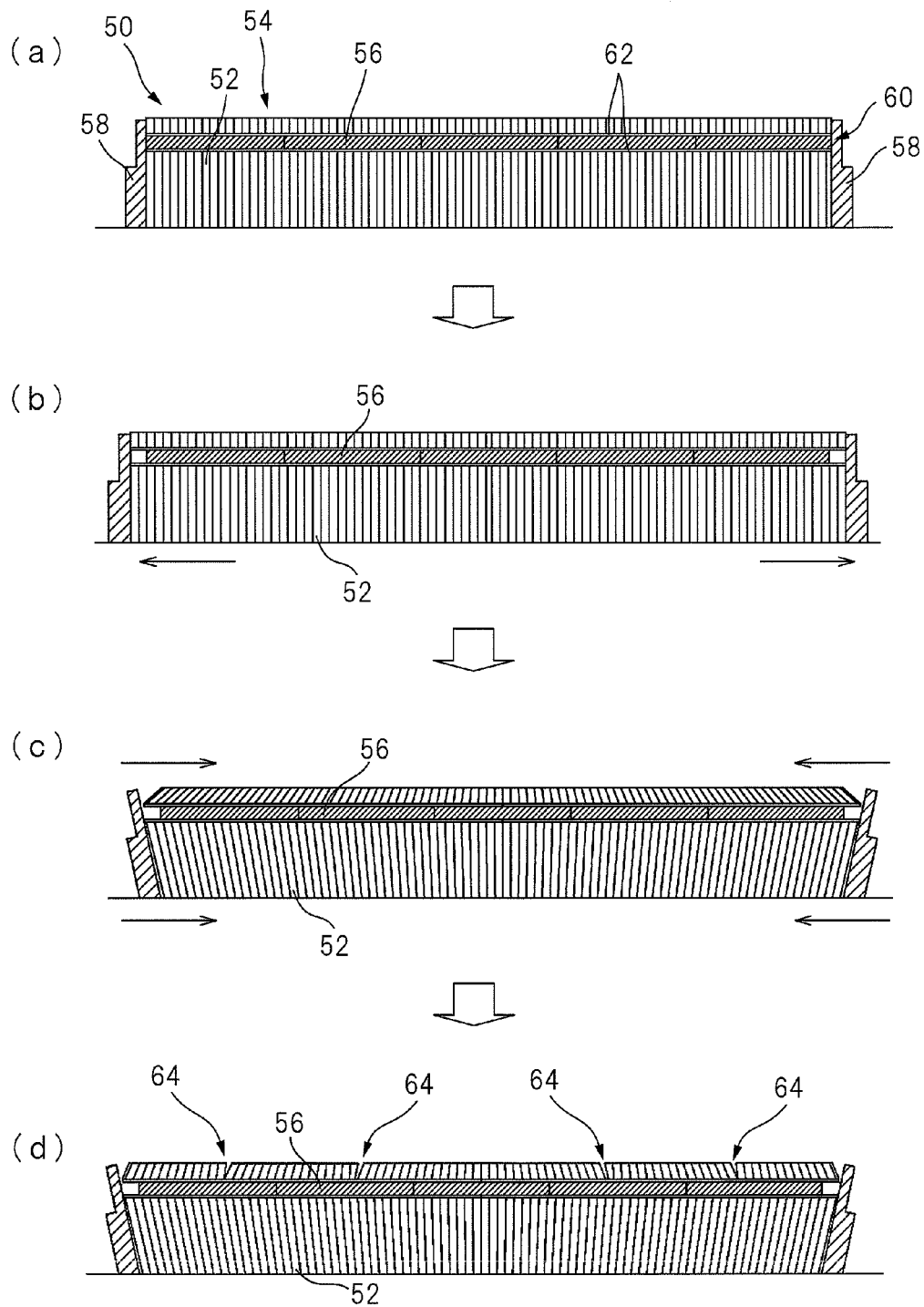
FIG. 11 is an axial cross-sectional view of a rotor of an electric motor of the prior art, including section (a) showing a state before adhesives is cured, section (b) showing a state wherein the temperature of the rotor is increased to a curing temperature of the adhesives, section (c) showing a state wherein the temperature of the rotor is decreased, from the state of section (b), to a lower limit of an operating temperature of the motor, and section (d) showing a state wherein a part of stacked magnet steel plates is cracked.

Then, when the temperature of rotor core 26 is lowered to a lower limit of an operating temperature of the electric motor, magnetic steel plate 24 contracts mainly in the direction of the rotation axis, while permanent magnet 28 changes little in the dimension thereof. Further, since permanent magnet 28 is bonded and fixed to magnetic steel plate 24, as shown in a section (c) of FIG. 9, an axial distance between permanent magnets 28 is reduced (more concretely, a distance between the axial end surfaces of neighboring permanent magnets 28 is reduced). However, deformable intervening member 40 is disposed between the end surfaces of permanent magnets 28 as described above, a strain of rotor core 26 is accommodated by the compressive deformation of intervening member 40 in the axial direction, whereby the disadvantage as shown in FIG. 11 can be avoided. In addition, the thickness of intervening member 40 is determined is determined so that neighboring permanent magnets 28 do not contact each other at the lower limit of the operating temperature of the electric motor, as shown in section (c) of FIG. 9.

Although magnetic steel plate 24 changes in the dimension also in the radial direction of the rotor (the vertical direction in FIG. 9) due to temperature change, the thermal strain in the radial direction of the rotor does not become a problem, since permanent magnet 28 has a relatively high linear expansion coefficient in a magnetizing direction (or in a direction of easy magnetizing), i.e., in the radial direction of the rotor (for example, $6.5 \times 10^{-6}$/K in the case of a neodymium magnet).

Figure 10:
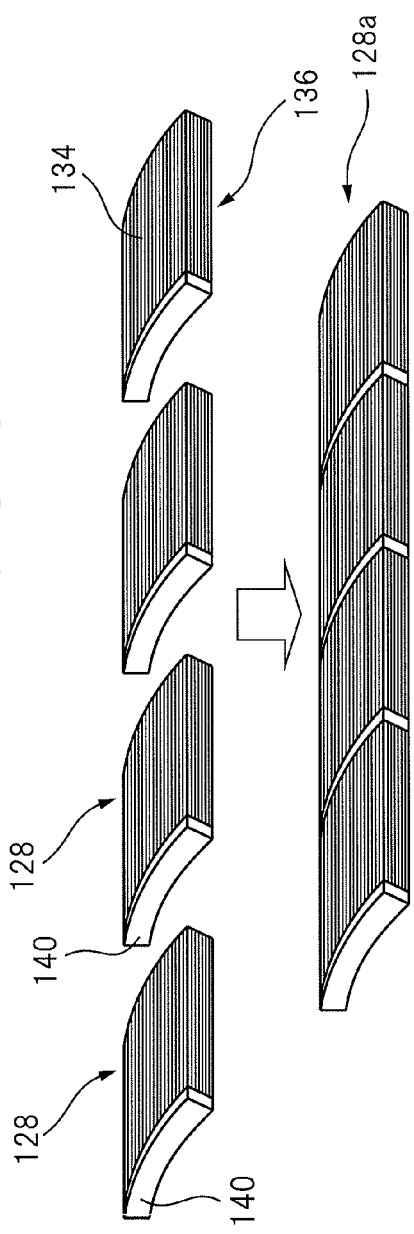
FIG. 10 is a view of a schematic configuration of an electric motor according to another embodiment of the present invention.
Figure 10:
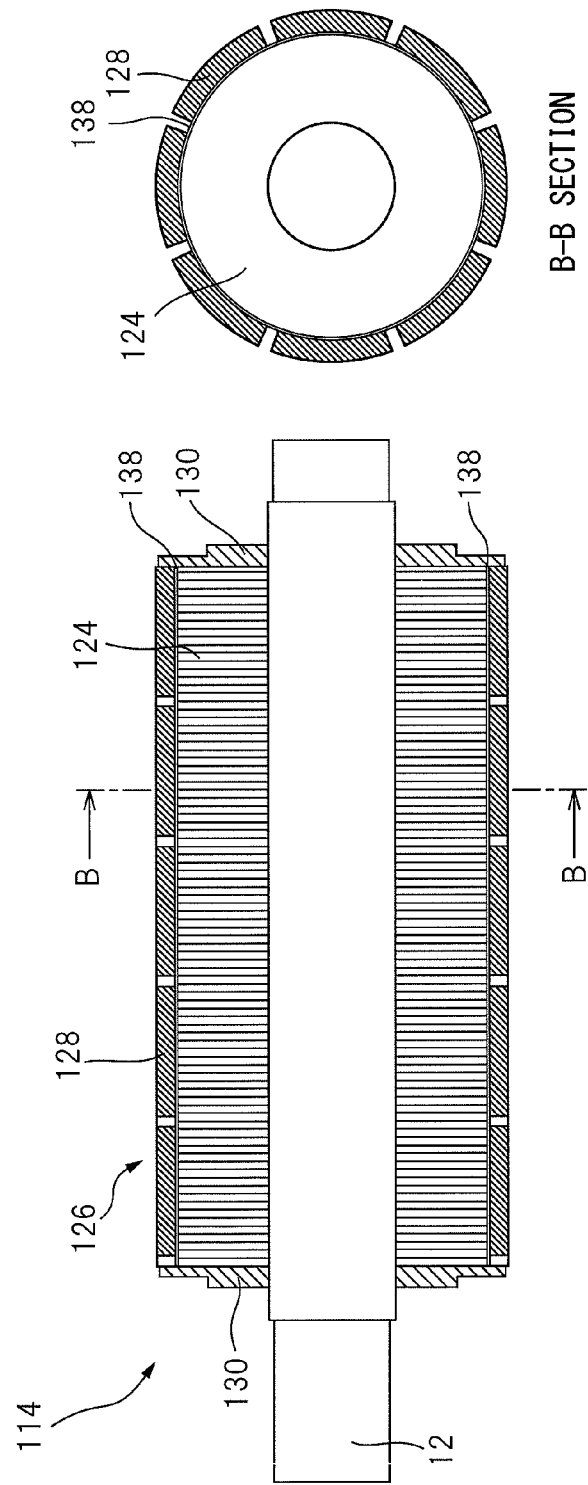

FIG. 10 shows another embodiment of a rotor of an electric motor according to the invention, i.e., an SPM structure rotor 114 wherein permanent magnets are attached to a surface of the structure. Rotor 114 has a rotor core 126 constituted by stacking annular magnetic steel plates 124, a plurality of permanent magnets 128 embedded in rotor core 126, and two end plates 130 which sandwiches or clamps magnetic steel plates 124 from both axial sides. For example, each permanent magnet 128 is a neodymium magnet having a generally plate shape, and preferably, each magnet has the same shape. As shown in FIG. 10, permanent magnets 128 are aligned in the direction of the rotation axis (in detail, an end surface of each magnet faces each other so as to constitute a curved magnet plate extending in the direction of the rotation axis of the rotor), and are bonded to an outer side surface of rotor core 126. In detail, among major surfaces 134 and 136 of each permanent magnet 128, concaved major surface 136 is bonded to the generally cylindrical side surface of rotor core 126 by means of thermoset adhesive agent 138. Each permanent magnet 128 does not contact each other, and a deformable intervening member 140 is positioned between the end surfaces of the magnets.

In adhering permanent magnets 128 to the outer surface of rotor core 126, a plurality of permanent magnets 26 connected to each other via intervening member 140 therebetween (as indicated by reference numeral 128a if FIG. 10) may be bonded to rotor core 126. Alternatively, each permanent magnet 128 having intervening member 140 at one end thereof may be sequentially bonded to rotor core 126.

Intervening member 140 and the function thereof may be the same as intervening member 40 explained regarding the IPM structure rotor, and thus a detailed explanation thereof is omitted. As such, the present invention can be applied to both the IPM structure wherein the permanent magnet is embedded into the rotor core and the SPM structure wherein the permanent magnet is bonded and fixed to the outer surface of the rotor core.

Although the permanent magnet is explained as a neodymium magnet in the embodiment, the present invention is not limited as such. For example, the permanent magnet may be a ferrite magnet. The present invention may be applied to a case wherein linear expansion coefficients of the permanent magnet and the magnetic steel plate (iron) in the direction of the rotation axis are different.

According to the present invention, even when the temperature of the rotor is lowered from the temperature when the permanent magnet is bonded to the rotor so that a difference in the axial direction occurs between the magnetic steel plate and the permanent magnet, the difference is accommodated by the deformation of the intervening member positioned between the permanent magnets, whereby the disadvantage such as damage to the rotor can be avoided.

In the invention, it is not necessary to make a gap between aligned magnets as in the prior art, and the magnets are aligned in the axial direction and bonded to the rotor surface also in the SPM structure. Therefore, it is not necessary to purposely form the gap between the magnets. Further, it is not necessary to use a special adhesive agent. In addition, in adhering the permanent magnet, it is only necessary to bond the permanent magnet to the rotor core, and thus it is not necessary to bond the magnets to each other. Therefore, the adhesive agent does not stray or protrude and it is not necessary to wipe the strayed adhesive agent.

The member, which exists between the aligned permanent magnets at least until the adhesive agent is cured, is removed in the production process from between the permanent magnets, a space is formed between the magnets. Therefore, a strain and stress do not remain even when the rotor has a relatively long length in the axial direction, and thus bending of the rotor does not occur. Further, the permanent magnet and the adhesive agent can be prevented from being cracked.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A production method of an electric motor comprising a stator and a rotor configured to be rotated relative to the stator, wherein the method comprises the steps of:
    constituting a rotor core by stacking magnetic steel plates;
    aligning a plurality of permanent magnets in a direction of a rotation axis of the rotor and fixing the permanent magnets to the magnetic steel plate by means of adhesives;
    positioning an intervening member, which melts at a temperature higher than a curing temperature of the adhesives, between the permanent magnets which are adjacent to each other in the direction of the rotation axis; and
    heating the rotor after the adhesives are cured so that the intervening member melts and flows from between neighboring permanent magnets,
    wherein a thickness of the intervening member in the direction of the rotation axis is determined so that neighboring permanent magnets, which are bonded to the rotor core within a manufacturing temperature range of the rotor, do not contact each other at a lower limit of an operating temperature of the electric motor.

2. The production method as set forth in claim 1, comprising the step of alternately inserting the permanent magnet and the intervening member into a magnet insert hole which is formed in the rotor core.

3. The production method as set forth in claim 1, comprising the step of previously adhering the intervening member to an end surface of the permanent magnet which faces in the direction of the rotation axis.

* * * * *